(12) United States Patent
Scott, IV (10) Patent No.: US 11,383,631 B2
(45) Date of Patent: Jul. 12, 2022

(54) APPARATUS AND METHOD FOR A SELF-ACTIVATING STOP FOR PREVENTING WATERCRAFT FROM SLIDING OFF TOWING TRAILERS

(71) Applicant: William E. Scott, IV, Anchor Point, AK (US)

(72) Inventor: William E. Scott, IV, Anchor Point, AK (US)

(73) Assignee: Boat Load Mate, Inc., Naples, FL (US)

( * ) Notice: Subject to any disclaimer, the term of this patent is extended or adjusted under 35 U.S.C. 154(b) by 215 days.

(21) Appl. No.: 16/865,876

(22) Filed: May 4, 2020

(65) Prior Publication Data

US 2020/0262329 A1    Aug. 20, 2020

Related U.S. Application Data

(63) Continuation of application No. 16/026,365, filed on Jul. 3, 2018, now Pat. No. 10,682,943.

(60) Provisional application No. 62/590,429, filed on Nov. 24, 2017.

(51) Int. Cl.
    *B60P 3/10* (2006.01)
(52) U.S. Cl.
    CPC ........... *B60P 3/1066* (2013.01); *B60P 3/1075* (2013.01)
(58) Field of Classification Search
    CPC .......... B60P 1/10; B60P 3/1066; B60P 3/1075
    See application file for complete search history.

(56) References Cited

U.S. PATENT DOCUMENTS

| | | |
|---|---|---|
| 3,056,520 A | 10/1962 | Rutigliano |
| 3,082,892 A | 3/1963 | Cox |
| 3,155,249 A | 11/1964 | Johnson |
| 3,175,710 A | 3/1965 | Kistner |
| 3,863,594 A | 2/1975 | Gawthrop |
| 3,946,460 A | 3/1976 | Johnson |
| 3,946,614 A | 3/1976 | Martin |
| 4,110,867 A | 9/1978 | Gwozdz |
| 4,448,438 A | 5/1984 | Dewalk |
| 4,684,145 A | 8/1987 | Tingley |
| 4,995,629 A | 2/1991 | Poppell |
| 5,060,963 A | 10/1991 | Godbersen |
| 5,193,835 A | 3/1993 | Sheets |
| 5,263,733 A | 11/1993 | Kastenberger et al. |

(Continued)

FOREIGN PATENT DOCUMENTS

CA       2055766 A1    3/1993

*Primary Examiner* — Tony H Winner
(74) *Attorney, Agent, or Firm* — Caesar Rivise, PC (57) ABSTRACT

An apparatus and method for providing a self-activating stop device at the back of a hauling trailer for a boat. The apparatus is a compact, lightweight and durable U-shaped housing having a retractable stop element pivotably positioned therein. Through-holes in the housing permit the apparatus to be quickly and easily secured to bunkers or other framing at the trailer back end. The U-shaped housing's top surface can be easily aligned with the top surface of the bunk or framing while the stop element is biased in an upright position. When the boat is lifted out of the water and slid onto the bunker or framing, the boat's presence pivots the stop element down into the housing and once the transom of the boat passes over the stop element, the stop element self-activates, pivoting upward acting as a stop against the transom, thereby preventing the boat from sliding back off of the trailer.

6 Claims, 13 Drawing Sheets

(56) References Cited

U.S. PATENT DOCUMENTS

| | | |
|---|---|---|
| 5,596,944 A | 1/1997 | Massie |
| 6,062,160 A | 5/2000 | Delcambre |
| 6,199,503 B1 | 3/2001 | Midgett |
| 6,923,138 B2 | 8/2005 | Holbrook |
| 8,256,789 B2 | 9/2012 | Bryant, II |
| 2003/0200911 A1 | 10/2003 | Tatro et al. |
| 2009/0273158 A1 | 11/2009 | Brisson et al. |
| 2009/0302572 A1 | 12/2009 | Bryant, II |
| 2011/0133429 A1 | 6/2011 | Caudill |
| 2017/0182926 A1 | 6/2017 | Rice |

APPARATUS AND METHOD FOR A SELF-ACTIVATING STOP FOR PREVENTING WATERCRAFT FROM SLIDING OFF TOWING TRAILERS

CROSS-REFERENCE TO RELATED APPLICATIONS

This Continuation application claims the benefit under 35 U.S.C. § 120 of application Ser. No. 16/026,365 (now U.S. Pat. No. 10,682,943 issued Jun. 16, 2020) filed on Jul. 3, 2018 entitled APPARATUS AND METHOD FOR A SELF-ACTIVATING STOP FOR PREVENTING WATERCRAFT FROM SLIDING OFF TOWING TRAILERS which in turn claims the benefit under 35 U.S.C. § 119(e) of Application Ser. No. 62/590,429 filed on Nov. 24, 2017 entitled QUICK CATCH FLIP STOP TRAILER MATE and all of whose entire disclosures are incorporated by reference herein.

BACKGROUND OF THE INVENTION

The present invention relates to self-activating stops and more particularly to a self-activating stop that is installed at the end of a trailer for hauling watercraft (e.g., boats, jet skis, etc.) to prevent the watercraft from sliding off the trailer during retrieval of the watercraft from the water.

The patent literature includes a few examples of devices meant for preventing a boat from sliding back off of a trailer. See for example, U.S. Pat. No. 3,175,710 (Kistner) and U.S. Patent Publication No. 2017/0182926 (Rice). While the aforementioned devices may be generally suitable for their intended purposes, they suffer from several drawbacks, e.g., complex construction and weight, cost, ease of use, etc. The subject invention addresses the needs of the prior art.

All references cited herein are incorporated herein by reference in their entireties.

BRIEF SUMMARY OF THE INVENTION

A self-activating stop apparatus for use with a watercraft towing trailer is disclosed. The apparatus comprises: a U-shaped channel housing; a stop element, pivotally-mounted within the U-shaped channel housing such that the stop element can be positioned inside the U-shaped housing defining a retracted mode and can also be positioned such that a portion of the stop element is positioned outside of the U-shaped channel housing defining a deployed mode; a spring positioned between the stop element and a portion of the U-shaped channel housing, the spring urging the stop element into the deployed mode; and wherein the apparatus is self-activating in that when the apparatus is positioned at a rear end of the watercraft towing trailer, the passage of the watercraft over the apparatus causes the stop element to be in the retracted mode and when a transom portion of the watercraft clears the stop element, the stop element is automatically positioned in the deployed mode to prevent the watercraft from sliding off the rear end of the watercraft towing trailer.

A method for providing a self-activating stop at the rear portion of a watercraft towing trailer (e.g., salt/sea water towing trailer) for preventing a watercraft from sliding off the trailer is disclosed. The method comprises: forming a U-shaped channel housing having a plurality of apertures therein, wherein a pair of apertures are aligned between sidewalls in the U-shaped channel housing; positioning a stop element, having a stop element aperture and a cavity therein, in a channel portion of the U-shaped channel housing; inserting one end of a spring in the cavity and another end of the spring in a nest in a floor that connects said sidewalls together of the U-shaped channel housing; aligning the stop element aperture between the pair of the aligned apertures; passing a fastener through the pair of apertures and through the stop element aperture to form a self-activating stop defined by a deployed mode and a retracted mode, wherein the deployed mode is formed by the spring urging a portion of the stop element out of the U-shaped channel and the retracted mode is formed by a watercraft passing over the stop element and positioning the stop element within the U-shaped channel housing; securing the U-shaped channel housing to a rear end of the watercraft towing trailer such that the stop element automatically rests against a transom portion of a watercraft that has cleared the stop element to act as a stop against the watercraft.

A method for providing a self-activating stop at the rear portion of a watercraft towing trailer (e.g., fresh water towing trailer) for preventing a watercraft from sliding off the trailer is disclosed. The method comprises: forming a U-shaped channel housing having a plurality of apertures therein, wherein a first pair of apertures are aligned between sidewalls in the U-shaped channel housing and a second pair of apertures are formed in a floor that connects the two sidewalls together; passing respective fasteners through the second pair of apertures and into the rear portion of the watercraft towing trailer; positioning a stop element, having a stop element aperture and a cavity therein, in a channel portion of the U-shaped channel housing; inserting one end of a spring in the cavity and another end of the spring in a nest in the floor of the U-shaped channel housing; aligning the stop element aperture between the first pair of the aligned apertures; passing a third fastener through the first pair of aligned apertures and through the stop element aperture to form a self-activating stop defined by a deployed mode and a retracted mode, whereby the deployed mode is formed by the spring urging a portion of the stop element out of the U-shaped channel and the retracted mode is formed by a watercraft passing over the stop element and positioning the stop element within the U-shaped channel housing; and wherein the stop element automatically rests against a transom portion of a watercraft that has cleared the stop element to act as a stop against the watercraft.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 1:
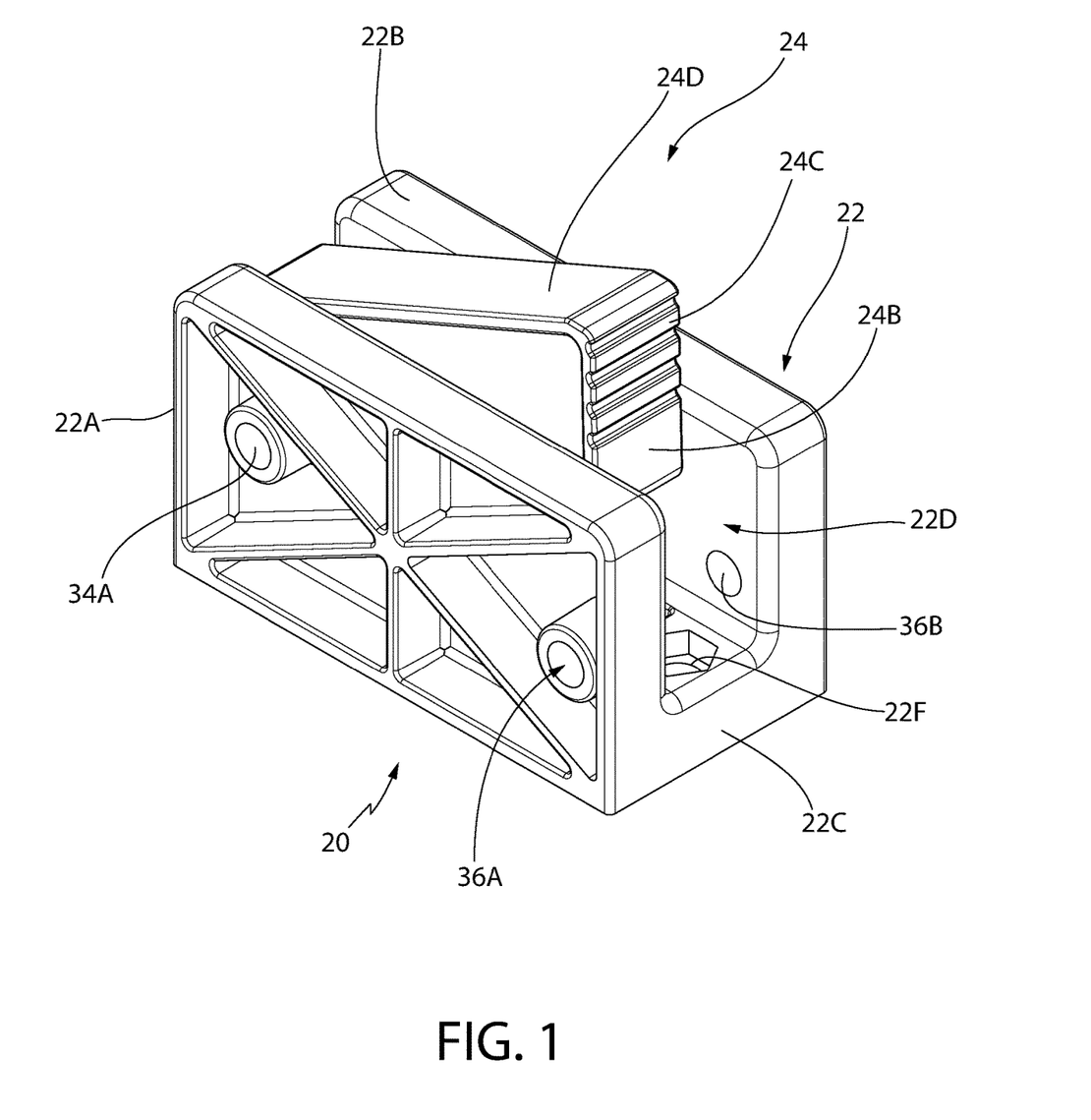
FIG. 1 is a perspective view of a self-activating stop device of the present invention shown in its deployed mode.
Figure 2:
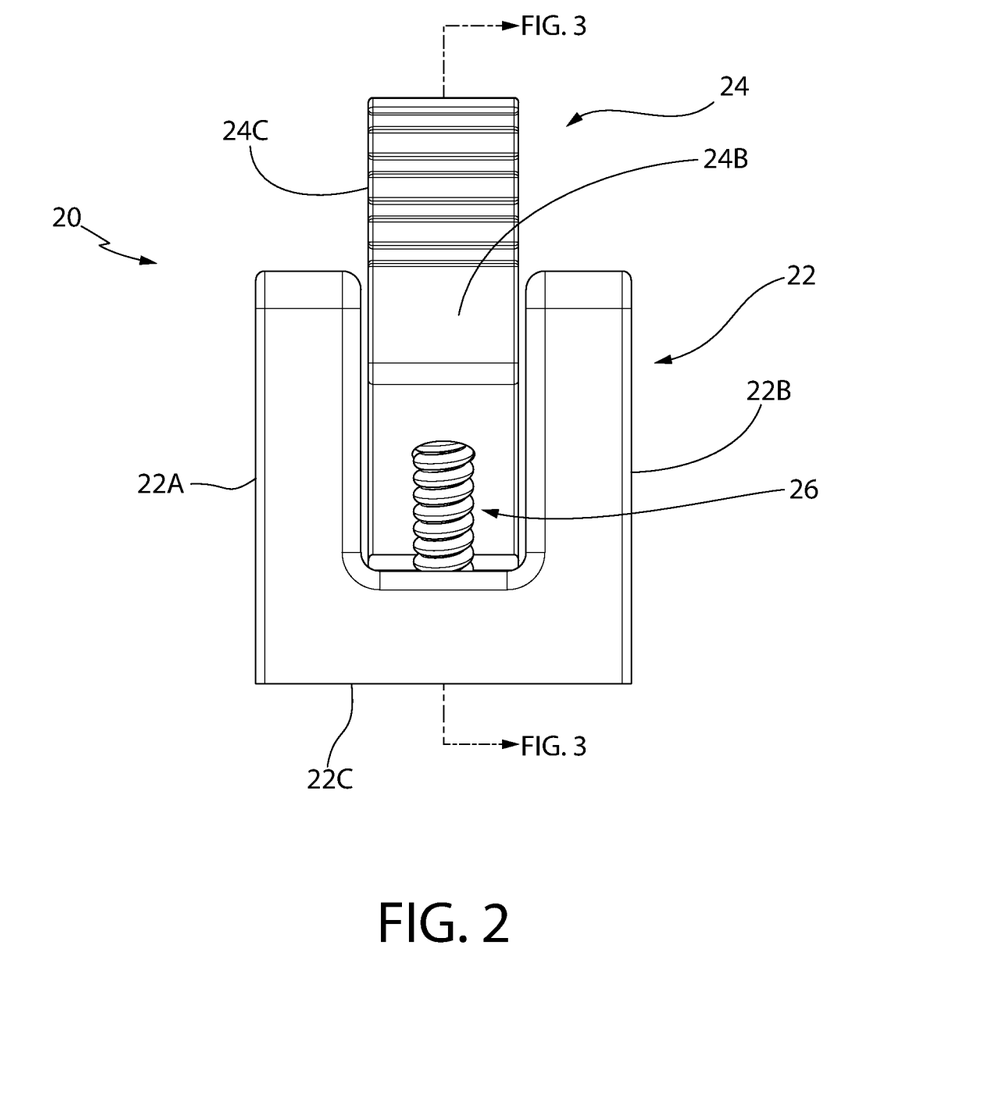
FIG. 2 is a front view of the self-activating stop device of the present invention.

The self-activating stop device (SASD) 20 of the present invention is shown most clearly in FIG. 1. The SASD 20 is designed for mounting on watercraft towing trailers to prevent the watercraft (e.g., a boat) from sliding back off the towing trailer during transfer (i.e., loading and launching) of the boat from the water, or from a storage location, etc. As will discussed in detail later, the SASD 20 is designed for use on a variety of watercraft towing trailers that can be generally divided into two categories: salt-watercraft towing trailers and fresh-watercraft towing trailers. The SASD 20 is mounted differently depending upon which type of towing trailer is to be used, as will be discussed later.

Figure 3:
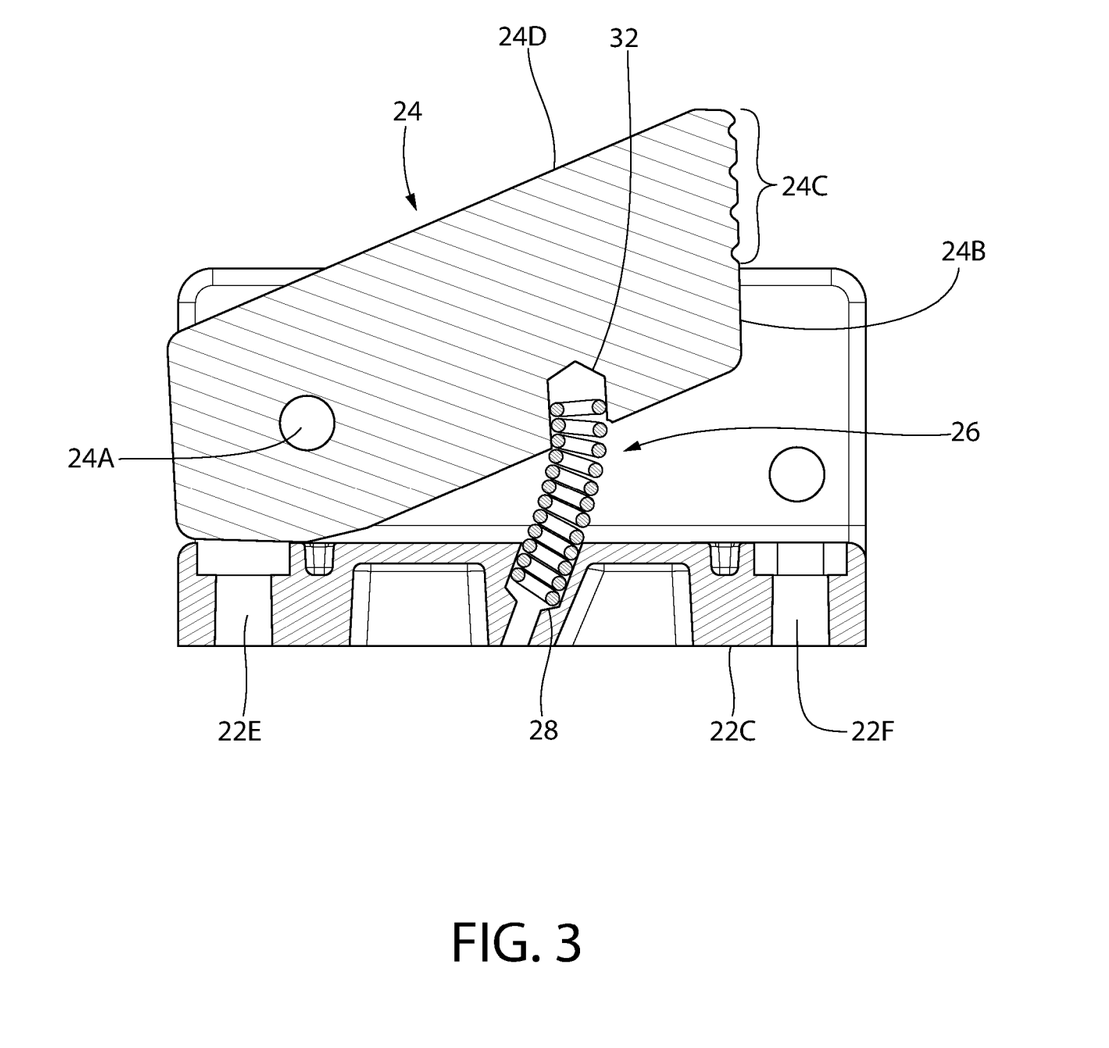
FIG. 3 is a cross-sectional view of the self-activating stop device taken along line 3-3 of FIG. 2.
Figure 13:
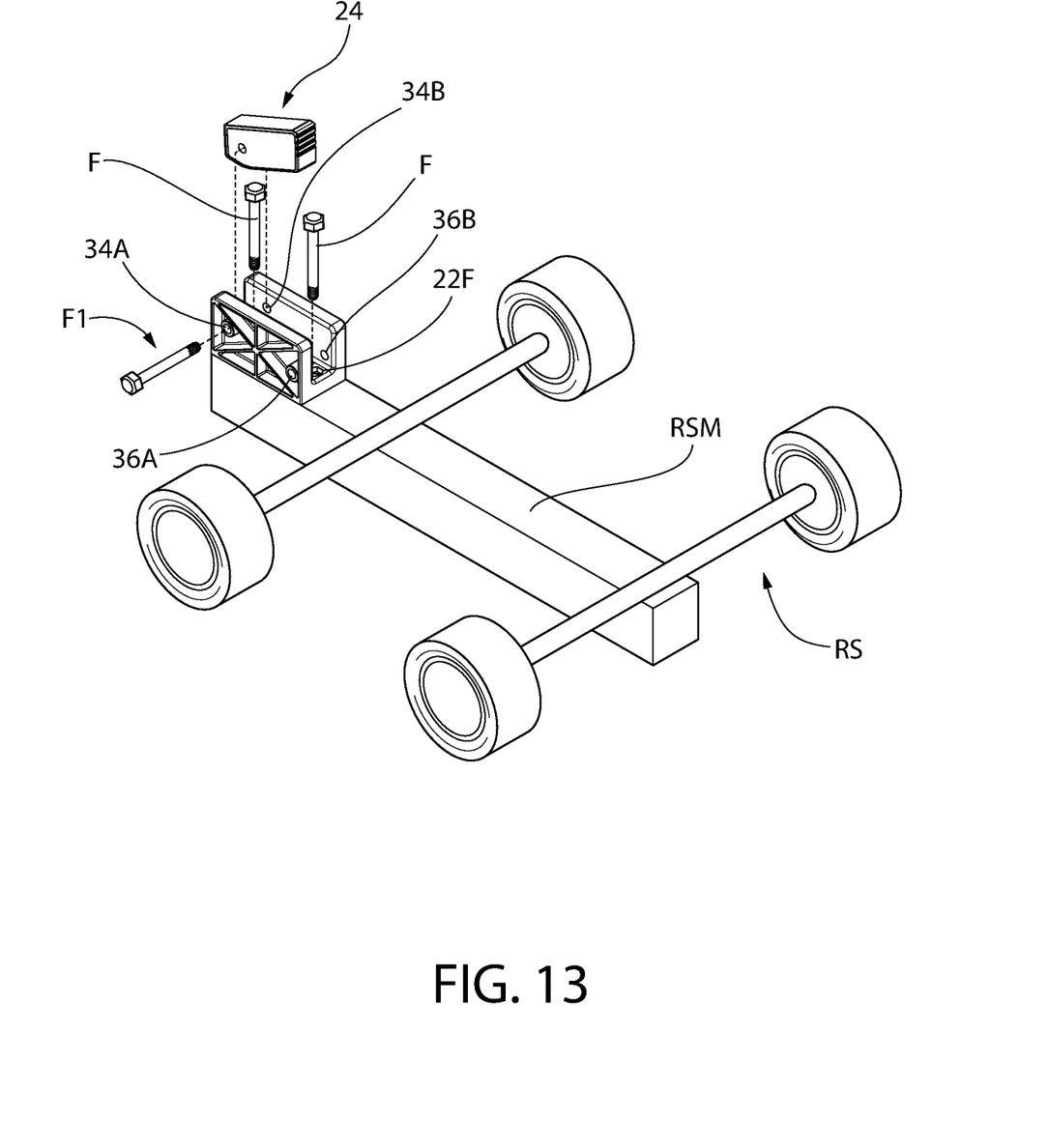
FIG. 13 is an exploded view of the self-activating stop device as it is installed on the roller system of a fresh-watercraft towing trailer and wherein the spring is omitted for clarity.

As shown in FIG. 1, the SASD 20 comprises a U-shaped channel housing 22 into which a stop element 24 is pivotally-mounted. The U-shaped channel housing 22 comprises a pair of sidewalls 22A and 22B connected by a floor 22C. One end of a biasing means, e.g., a spring 26 (FIG. 3) is positioned in a nest 28 in the floor 22C of the U-shaped channel housing 22 while the other end of the spring 26 is positioned in a cavity 32 in the stop element 24. The stop element 24 pivots about an axle, e.g., a fastener F1 (e.g., a bolt, see FIG. 13) that is passed through a respective aperture 34A (aperture 34B is shown in FIG. 13) in the sidewalls 22A/22B when an aperture 24A in the stop element 24 is aligned with the sidewall apertures. In addition, another pair of apertures 36A and 36B in respective sidewalls 22A and 22B are provided for mounting the SASD 20, as will also be discussed later. As one can appreciate, the spring 26 urges the stop element 24 upward, causing the stop element 24 to pivot about the fastener F1 such that a ridged portion 24C of a stop surface 24C projects out of the U-shaped channel housing 22. In that state, known hereinafter as the "deployed mode", the SASD 20 acts a stop to a surface in contact with the ridged portion 24C. The ridges of the portion 24C act to make a more resistive contact with the watercraft, e.g., the transom portion of a boat. Conversely, when the weight of the watercraft is placed on the upper surface 24D of the stop element 24, the stop element 24 is forced downward, against the bias of the spring 26, into the channel 22D, forming a "retracted mode." The upper surface 24D of the stop element 24 is of a constant gradient and is angled upward with respect to the U-shaped channel housing 22 when the stop element 24 is in the deployed mode.

The SASD 20 comprises a lightweight, strong, compact and durable construction (e.g., marine-grade, nylon glass-filled polycarbonate, such as, but not limited to "Standard ULTREX® manufactured by the Spiratex Company of Romulus, Mich.) designed to resist the corrosive salt-sea/salt-air environment. By way of example only, the SASD 20 may comprise a weight of approximately 0.75 lbs and having dimensions, by way of example also, of approximately 5" (length)×3" (width)×2" (height).

Salt-Watercraft Towing Trailers Using the SASD 20

Figure 4:
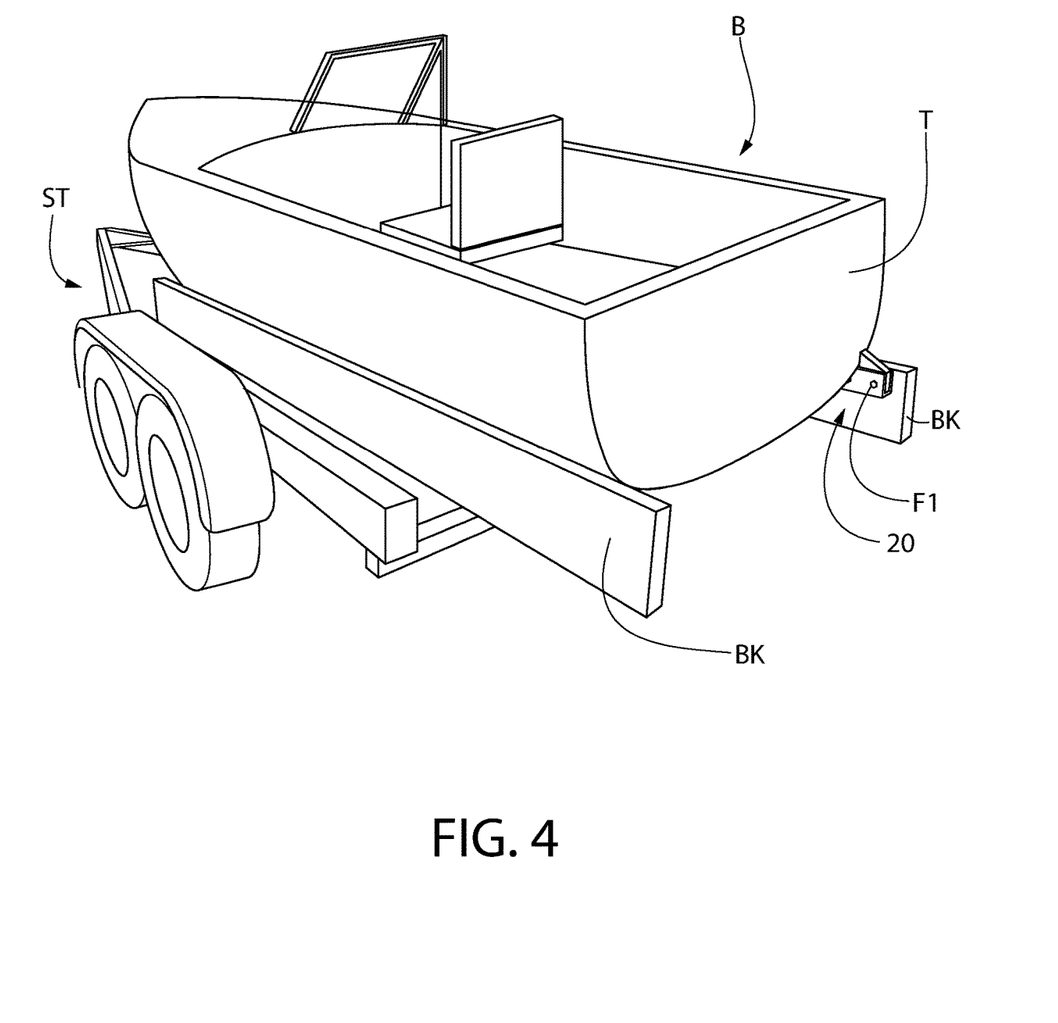
FIG. 4 is an isometric view of a boat deployed on a salt-watercraft towing trailer with the self-activating stop device coupled thereto.
Figure 5:
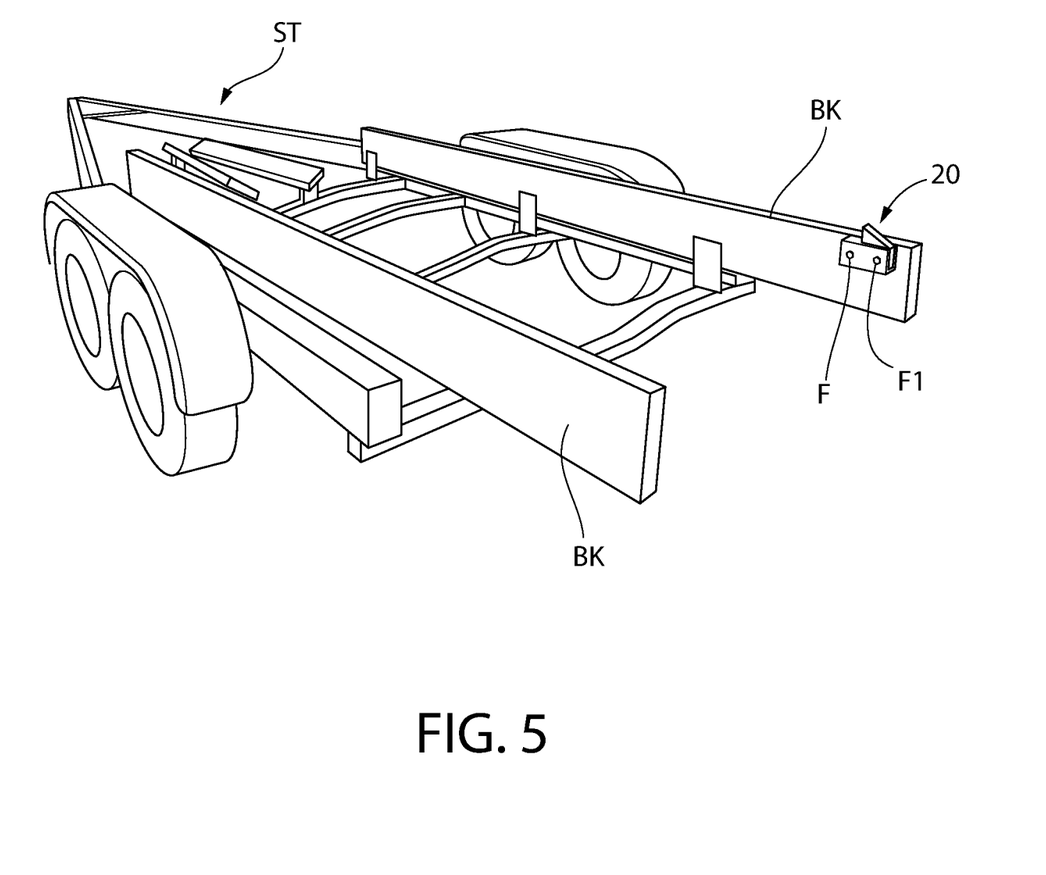
FIG. 5 is the same view as FIG. 4, but with the boat omitted to provide a clear view of the installation of the self-activating stop device.

Trailers that are commonly used for the transportation of and launching/loading of watercraft in sea/salt water typically utilize "bunks" to support the weight of the watercraft when the trailer is out of the water, and make it easy to launch or load the watercraft when the trailer is in the water. The term "bunks" as used throughout this Specification is directed to elements (typically comprising wood) that run along the sides of the trailer and upon which the watercraft (typically a boat) is positioned when it is loaded onto the trailer. As such, these bunks support the weight of the watercraft when the watercraft is loaded onto, or removed from, the trailer. An example of such bunks is shown in FIGS. 4-5. Because of the corrosive nature of salt water environments, bunks are typically comprised of wood which is well-known to withstand such environments.

FIG. 5 depicts an exemplary salt/sea watercraft towing trailer ST having a pair of bunks BK secured on each side of the trailer ST. The SASD 20 is then secured to one of the bunks BK at the rear of trailer ST. Because the bunk BK is typically comprised of wood, the SASD 20 can be quickly and easily mounted to the side of the bunk BK. In particular, to mount the SASD 20 to one of the bunks BK, the user aligns the top surface of the sidewall (22A or 22B) of the housing 22 that is in contact with the bunk BK. A marker (e.g., pen or pencil, etc.) is passed through the aligned apertures 34A/34B and 36A/36B to mark points on the bunk BK for forming respective holes therein (e.g., drilled). The SASD 20 is then attached as follows: the spring 26 and stop element 24 are assembled in the housing 22 and the fastener F1 is passed through the apertures 34A/34B and stop element aperture 24A and into the corresponding hole (not shown) in the bunk BK and then tightened therein. Another fastener F is passed through the apertures 36A/36B and into another corresponding hole (not shown) in the bunk BK and then tightened therein. As such, the SASD 20 is secured to the bunk, in the deployed mode, as shown in FIG. 5. One can appreciate that the fastener F1 has a dual use: not only does it form the axle about which the stop element 24 pivots but it is also used to secure the SASD 20 against the bunk BK.

Figure 6:
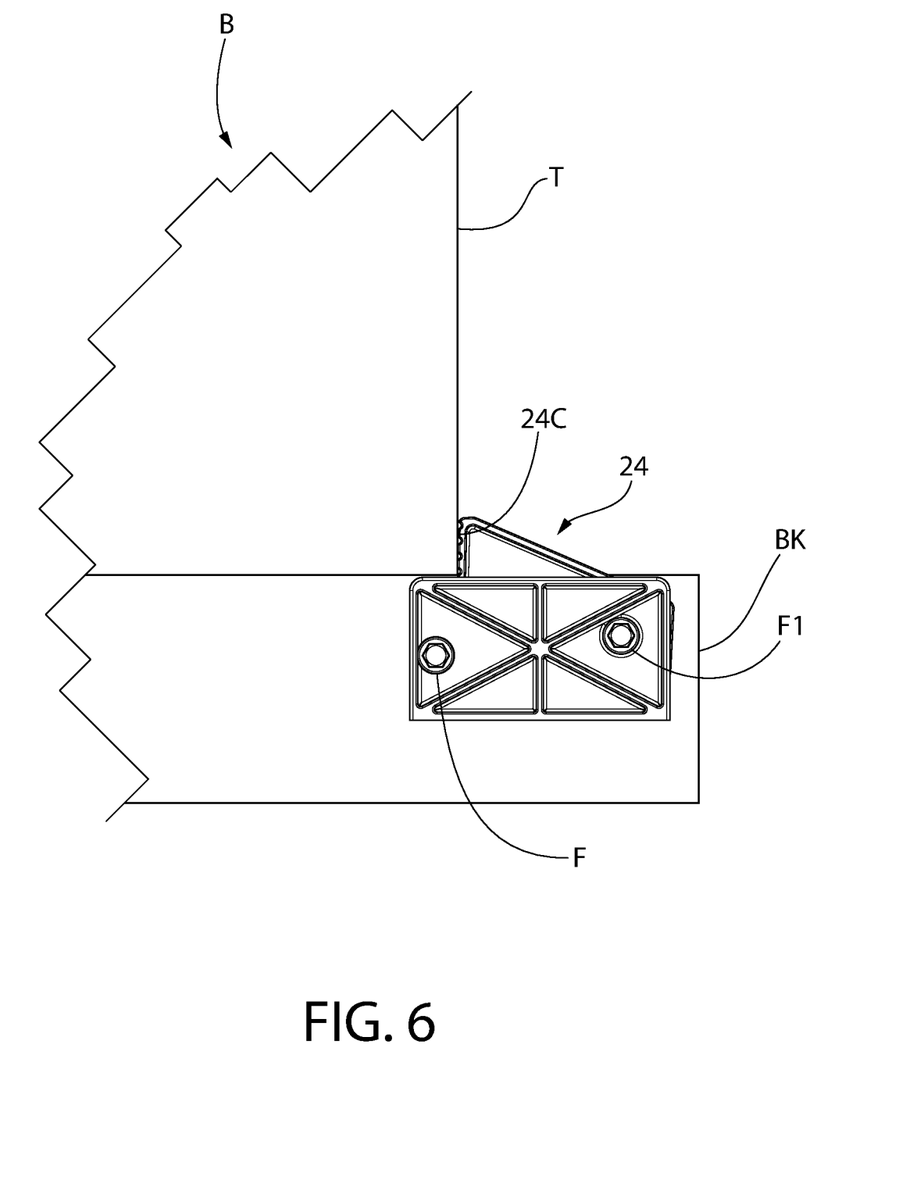
FIG. 6 is a partial view of the boat transom showing the self-activating stop device in the deployed mode acting as a stop to prevent the boat from sliding off the trailer.
Figure 8:
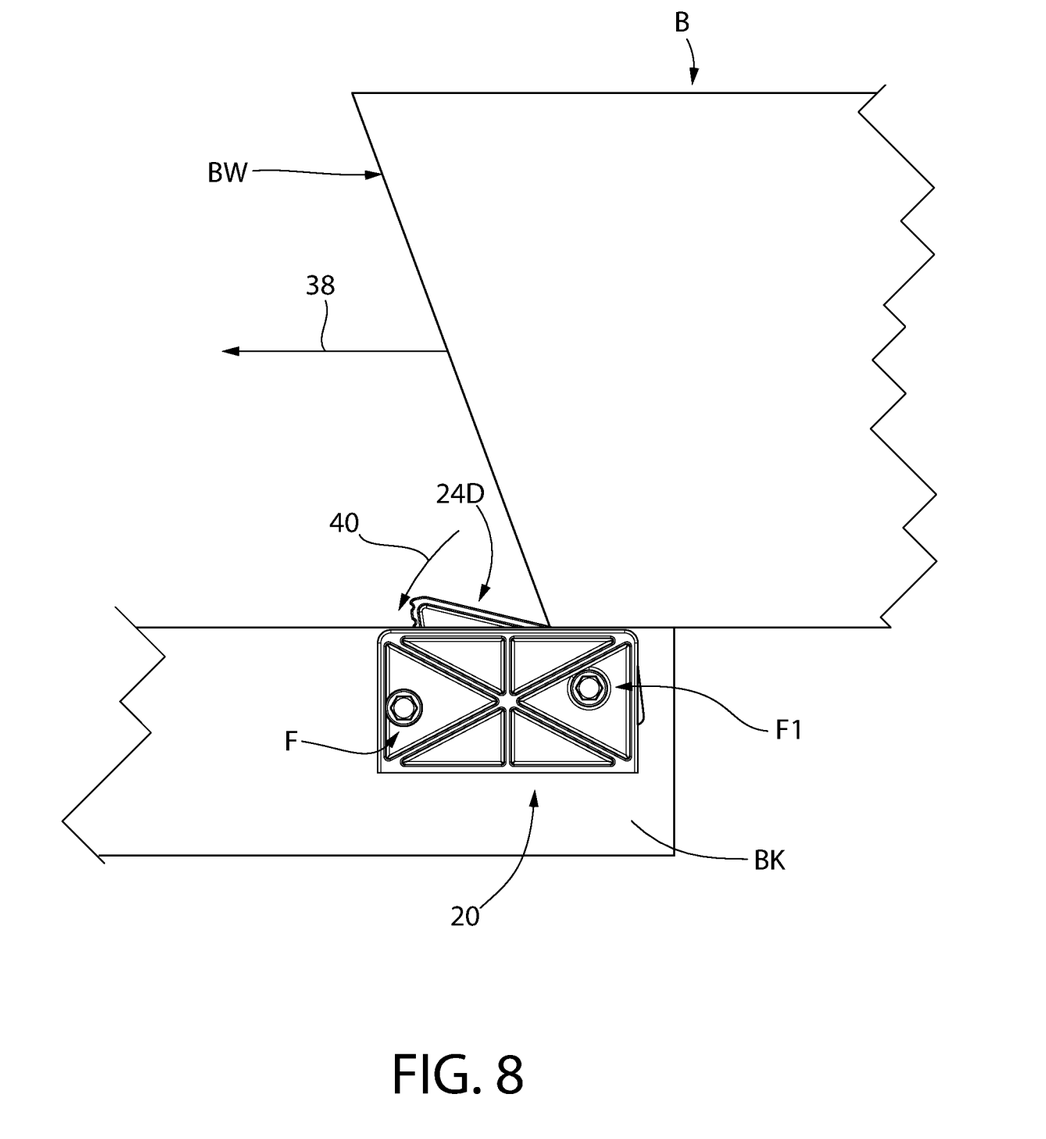
FIG. 8 is a partial view of the bow of the boat initially making contact with the self-activating stop device and causing the self-activating stop device to move into its retracted mode.

The SASD 20 is now ready for use. As shown most clearly in FIG. 8, when the bow BW of the watercraft (e.g., boat B) is lifted onto the two bunks BK at the rear of the trailer ST and moved forward (see arrow 38), the bow BW contacts the upper surface 24D of the stop element 24 and drives the stop element 24 downward (see arrow 40) into the channel 22D in the housing 22, i.e., the retracted mode. As the boat B continues to move forward while its weight is supported on the bunks BK, once the transom T (FIG. 6) of the boat B passes over the stop element 24, the spring 26 is free to displace the stop element 24 upward. As such, the ridged portion 24C of the stop element 24 acts as a stop to prevent the boat B from sliding back off the trailer ST, as shown most clearly in FIG. 4. Because of the presence of this stop element 24, this permits other mechanisms that secure the boat during transport to be removed prior to launching the boat in the boat slip area.

Figure 7:
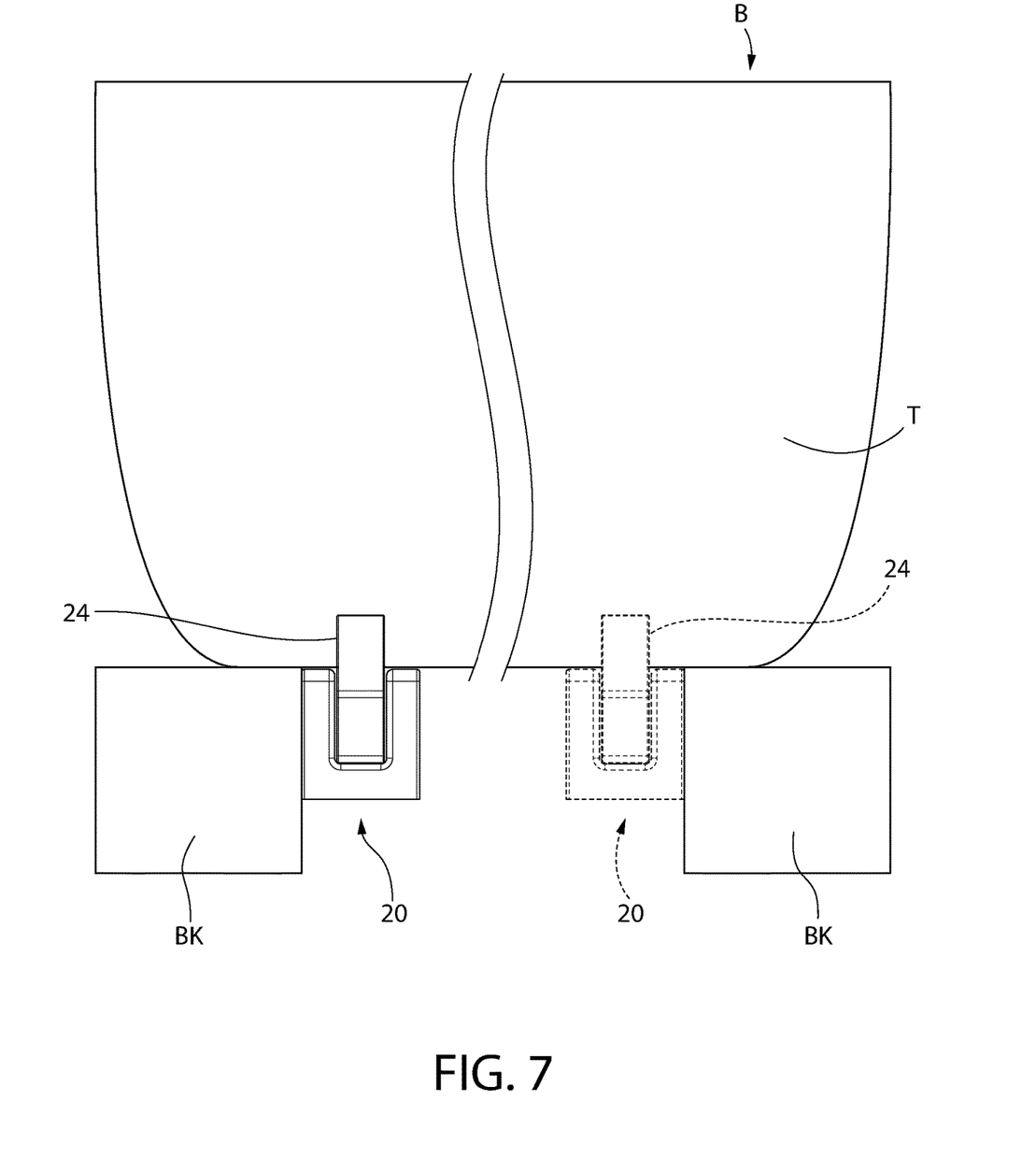
FIG. 7 is a rear view of the salt-watercraft towing trailer having the self-activating stop device coupled thereto and shown in the deployed mode acting against the transom of the boat; a second self-activating stop device is shown in phantom.
Figure 9:
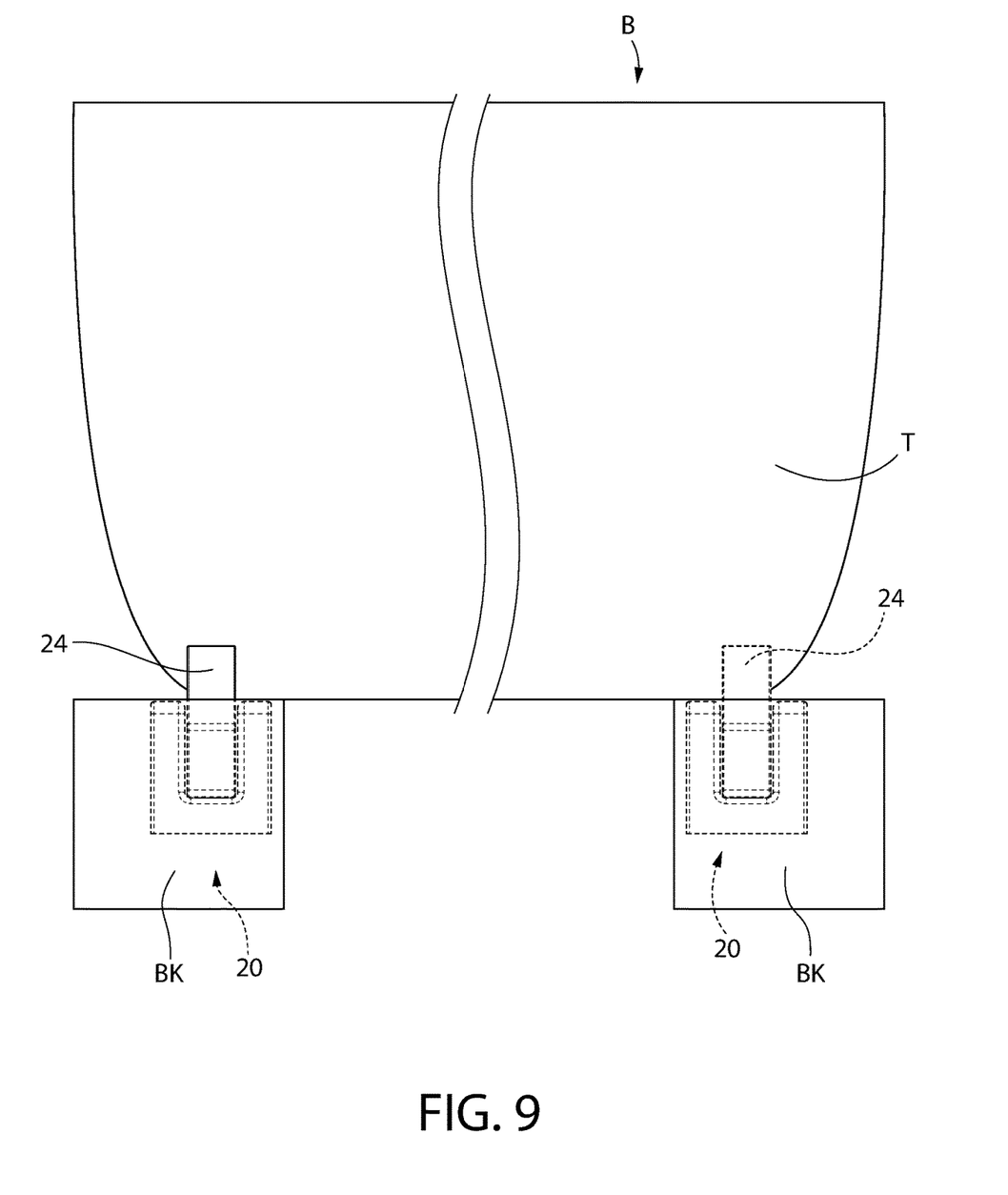
FIG. 9 is a rear view of a salt-water towing trailer having the self-activating stop device integrated into the towing trailer rather than being an add-on; a second integrated self-activating stop device is shown in phantom.

Although only one SASD 20 is required to secure the watercraft on the trailer ST, it should be noted that a second SASD 20 (shown in phantom in FIG. 7) can also be secured to the other bunk BK for added security. Moreover, it is within the broadest scope of the present invention to include a SASD 20 that is integrated within the bunk BK by the trailer ST manufacturer, as shown in FIG. 9. Thus, rather than being an "add-on", the SASD 20 can be an integrated feature of the trailer ST when manufactured.

Fresh Watercraft Towing Trailers Using the SASD 20

Figure 11:
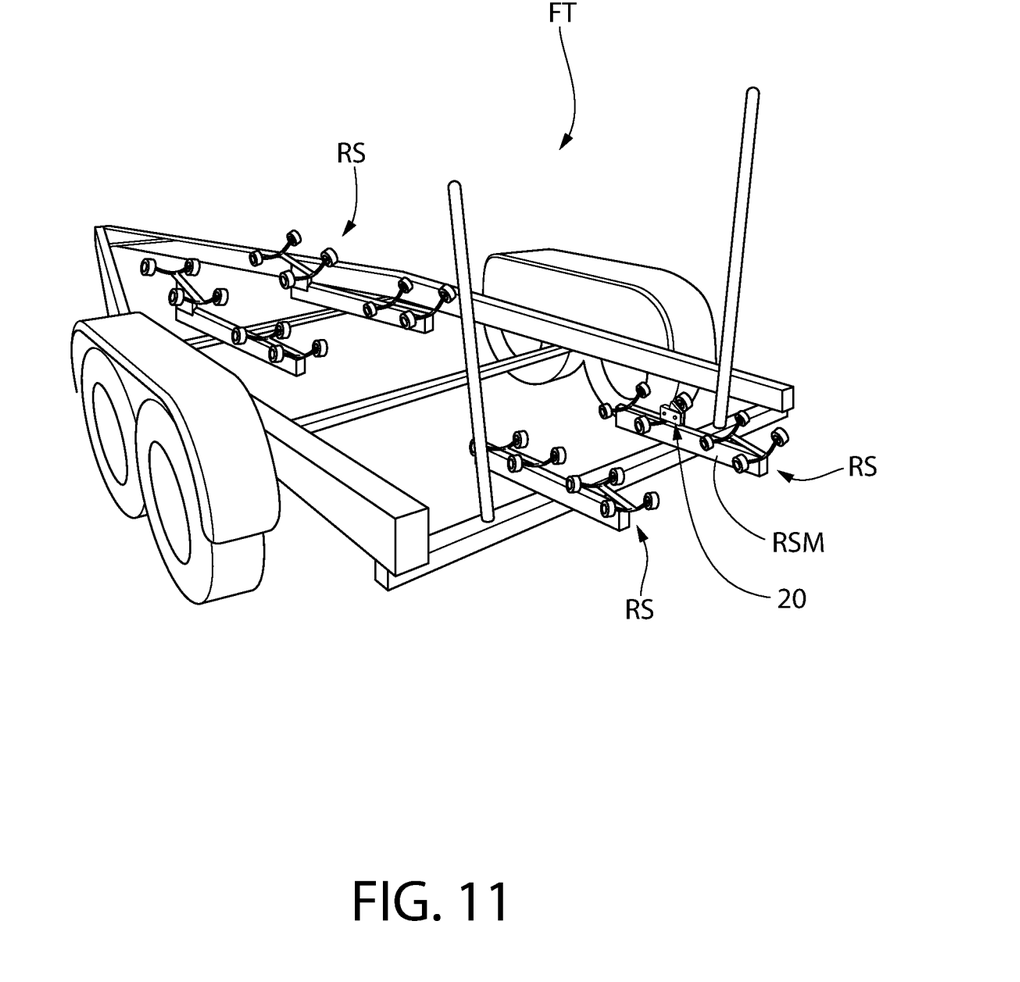
FIG. 11 is the same view as FIG. 10, but with the boat omitted to provide a clear view of the installation of the self-activating stop device.

Trailers used for towing fresh watercraft are not exposed to the corrosive salt water environment and therefore these types of trailers FT typically utilize roller systems RS for carrying the weight of the watercraft thereon (see FIG. 11). As such, there are no "wooden bunks" used on these types of trailers. To secure the SASD 20 on these freshwater towing trailers FT, the SASD 20 is typically secured to the trailer FT along the U-shaped channel housing floor 22C. To accommodate this different securing method, the floor 22C comprises a pair of countersunk apertures 22E/22F, as shown most clearly in FIG. 3. The countersunk portions of these apertures may comprise a "hex" shape (see FIG. 1 regarding countersunk aperture 22F) to lock the head of the fastener F (e.g., a bolt) therein.

Figure 12:
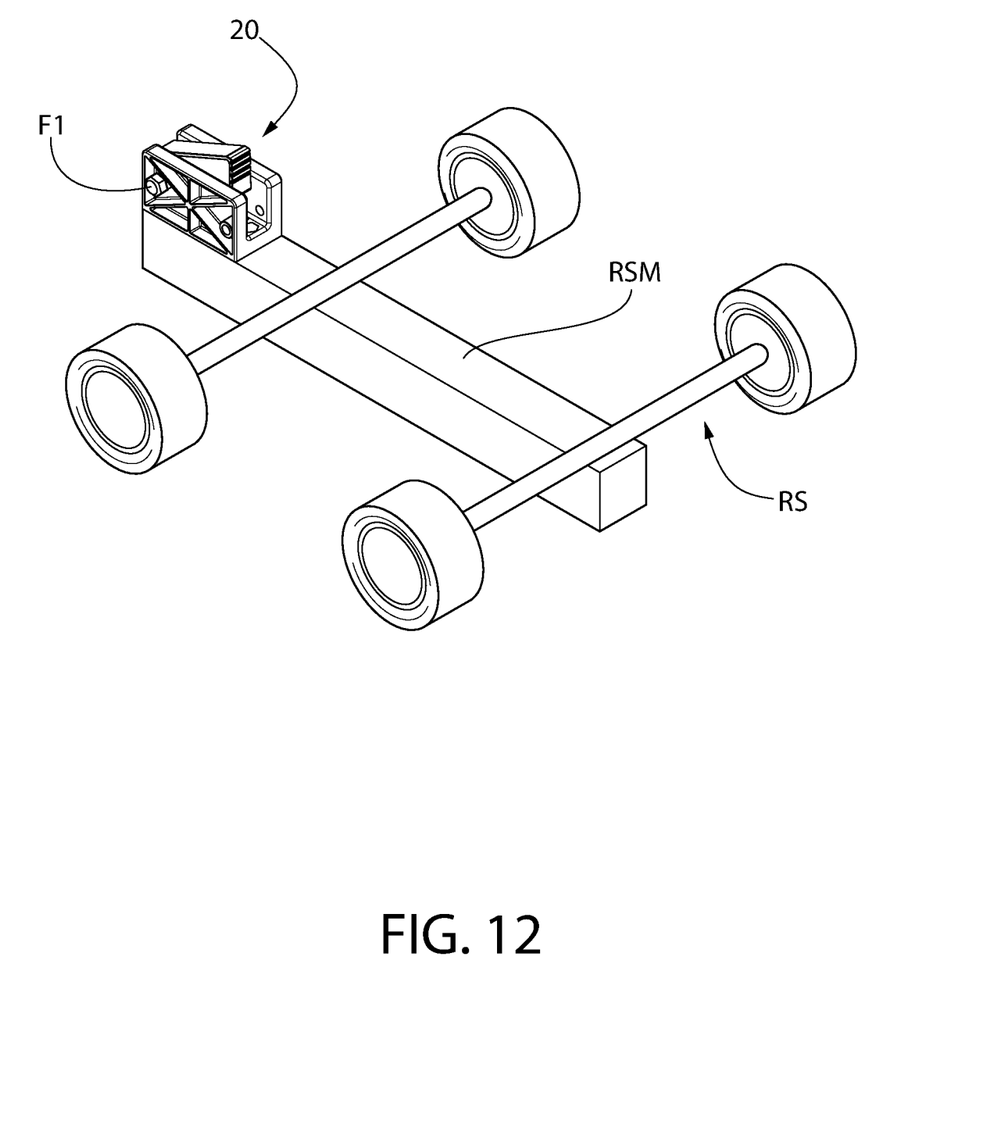
FIG. 12 is a diagrammatic view showing the installation of the self-activating stop device installed on a roller system of a fresh-watercraft towing trailer.

In particular, for ease of clarity, the attachment method for securing the SASD 20 to the freshwater trailer FT is shown in FIGS. 12-13. In particular, before the stop element 24/spring 26 are assembled in the U-shaped channel housing 22, the housing 22 itself is secured to one of the roller system mounts RSM. Fasteners F are passed through the countersunk apertures 22E/22F in the floor 22C and into the mount RSM plate. Once these fasteners are secured therein, the stop element 24 and spring 26 are assembled in the channel 22D. Since the SASD 20 is not being side-mounted as discussed previously with the salt/sea water trailer ST, the fastener F1 is then passed through the apertures 34A/34B and the stop element aperture 24A and secured on the other side of the housing 22 with a fastener tie-off, e.g., a lock nut (not shown), resulting in attachment of the SASD 20 to the roller system mount RSM, as shown in FIG. 12.

Figure 10:
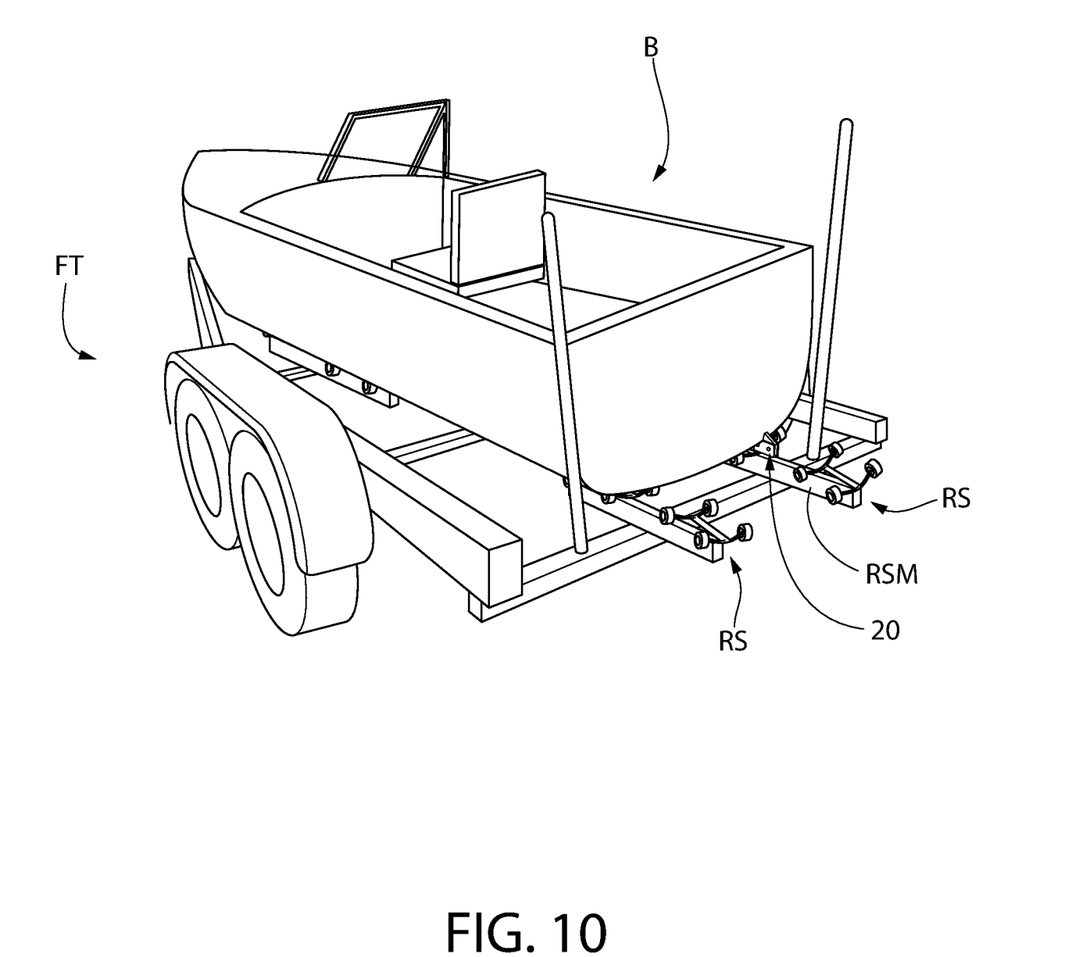
FIG. 10 is an isometric view of a boat deployed on a fresh-watercraft towing trailer with the self-activating stop device coupled thereto.

With the SASD 20 secured to the roller system mount RSM, the freshwater trailer FT is ready to receive the watercraft (e.g., boat B) thereon, as shown in FIG. 11. The SASD 20 operates in the same manner as described previously with regard to receiving the boat B on the salt/sea water trailer ST such that once the transom T of the boat B passes over the SASD 20 while riding on the roller system RS, the stop element 24 is positioned in the deployed mode, acting as stop against the boat transom T, as shown in FIG. 10.

As with the integrated design of the SASD 20 with the salt/sea watercraft trailer ST, it is within the broadest scope of the present invention to include an SASD 20 that is integrated into the roller systems RS by the FT trailer manufacturer. Thus, rather than being an "add-on", the SASD 20 can be an integrated feature of the trailer FT when manufactured.

Conversely, when it comes time to launch/release the watercraft (e.g., boat B) from the trailer ST/FT, the trailer ST or FT with the watercraft B thereon is backed down into the water and while the trailer ST or FT is submerged therein, the watercraft B floats on the water, thereby clearing itself of the SASD 20 and the trailer ST or FT. The operator of the watercraft B can then steer it away in the body of water. The trailer ST or FT is then driven out of the body of water.

The fasteners F/F1 used in the SASD 20 may comprise, by way of example only, ⅜" bolts.

In view of the foregoing, it should be understood that the SASD 20 of the present invention:
(1) is not a guidance tool. The SASD 20 does not guide the watercraft on and off the trailers ST/FT; rather the bunks BK and roller systems RS do that.
(2) does not carry the load of the watercraft (e.g., boat B); rather the bunks BK or the roller systems RS of the trailers ST and FT, respectively, do that.
(3) comprises apertures 34A/34B and 22E/22F that provide a "universal mounting" capability for the SASD 20.

While the invention has been described in detail and with reference to specific examples thereof, it will be apparent to one skilled in the art that various changes and modifications can be made therein without departing from the spirit and scope thereof.

What is claimed is:

1. A watercraft towing trailer for towing a watercraft thereon and including an integrated self-activating stop apparatus, said towing trailer comprising:
   a pair of bunks running along opposite sides of said trailer supported on respective wheel assemblies;
   at least one of said pair of bunks comprising a self-activating stop apparatus integrated within a top portion of said at least one of said pair of bunks, said self-activating stop apparatus comprising:
      a U-shaped channel housing;
      a stop element, pivotally-mounted within said U-shaped channel housing such that said stop element can be positioned inside said U-shaped housing defining a retracted mode and can also be positioned such that a portion of said stop element is positioned outside of said U-shaped channel housing defining a deployed mode;
      a spring positioned between said stop element and a portion of said U-shaped channel housing, said spring urging said stop element into said deployed mode; and
      wherein said apparatus is self-activating when a passage of said watercraft over said apparatus causes said stop element to be in said retracted mode and when a transom portion of the watercraft clears said stop element, said stop element is automatically positioned in said deployed mode to prevent said watercraft from sliding off the rear portion of the watercraft towing trailer.

2. The watercraft towing trailer of claim 1 wherein said U-shaped channel housing comprises a floor having a nest therein for receiving a first end of said spring and wherein said stop element comprises a cavity for receiving a second end, opposite said first end, of said spring therein.

3. The watercraft towing trailer of claim 1 wherein said portion of said stop element is configured for making contact with the transom portion of the watercraft and said portion of said stop element includes a surface comprising ridges.

4. The watercraft towing trailer of claim 1 wherein said U-shaped housing comprises sidewalls and wherein said sidewalls comprise top surfaces that are aligned with a top surface of a bunk of said watercraft towing trailer.

5. A method for forming a watercraft towing trailer having an integrated self-activating stop apparatus at a rear portion thereof for preventing a watercraft from sliding off the trailer, said method comprising the steps of:
  assembling a pair of bunks running along opposite sides of said trailer on respective wheel assemblies;
  forming a cavity within a top portion of one of said pair of bunks at the rear portion of said trailer, said cavity comprising a self-activating stop apparatus, said apparatus comprising:
    a U-shaped channel housing;
    a stop element, pivotally-mounted within said U-shaped channel housing such that said stop element can be positioned inside said U-shaped housing defining a retracted mode and can also be positioned such that a portion of said stop element is positioned outside of said U-shaped channel housing defining a deployed mode;
    a spring positioned between said stop element and a portion of said U-shaped channel housing, said spring urging said stop element into said deployed mode; and
    wherein said apparatus is self-activating when a passage of said watercraft over said apparatus causes said stop element to be in said retracted mode and when a transom portion of the watercraft clears said stop element, said stop element is automatically positioned in said deployed mode to prevent said watercraft from sliding off the rear portion of said watercraft towing trailer.

6. The method of claim 5 wherein said U-shaped housing comprises sidewalls and wherein said step of forming said cavity comprises the step of aligning top surfaces of said sidewalls with a top surface of said one of said bunks of said watercraft trailer.

* * * * *